US 7,511,737 B2

(12) United States Patent
Singh

(10) Patent No.: US 7,511,737 B2
(45) Date of Patent: Mar. 31, 2009

(54) SYNCHRONIZED MULTI-PERSPECTIVE PICTURES

(75) Inventor: Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 716 days.

(21) Appl. No.: 10/883,220

(22) Filed: Jun. 30, 2004

(65) Prior Publication Data

US 2006/0001744 A1   Jan. 5, 2006

(51) Int. Cl.
*H04N 5/232* (2006.01)
(52) U.S. Cl. .............................. 348/211.3; 348/211.11
(58) Field of Classification Search .............. 348/211.3, 348/211.11, 159
See application file for complete search history.

(56) References Cited

U.S. PATENT DOCUMENTS

| 6,204,877 | B1 | 3/2001 | Kiyokawa | |
|---|---|---|---|---|
| 7,130,895 | B2 * | 10/2006 | Zintel et al. | 709/220 |
| 2001/0028399 | A1 | 10/2001 | Conley | |
| 2003/0076413 | A1 | 4/2003 | Kanade et al. | |
| 2004/0135904 | A1 * | 7/2004 | Shiota et al. | 348/231.99 |

* cited by examiner

*Primary Examiner*—Sinh Tran
*Assistant Examiner*—Yogesh Aggarwal

(57) ABSTRACT

In a method for synchronized multi-perspective image capture, an ad hoc network is formed between a plurality of image capture devices. A leader is then selected from the plurality of image capture devices. The leader sends the other image capture devices (termed "followers") a capture message. In response to the capture message, the follower image capture devices synchronously capture images of a common subject matter. The follower image capture devices send their respective captured images to the leader. The leader then consolidates the captured images. In this manner, simultaneous and/or synchronized multi-perspective image capture of a common subject matter is accomplished without requiring expensive or specialized devices.

9 Claims, 5 Drawing Sheets

SYNCHRONIZED MULTI-PERSPECTIVE PICTURES

FIELD OF THE INVENTION

The present invention relates to image captures, and more particularly to the synchronization of multi-perspective image captures.

BACKGROUND OF THE INVENTION

A panoramic view is one type of multi-perspective image. Such an image is often exciting and desired by users because they allow them to see an entire scene or more than one perspective of the same scene. This type of view is not possible for human eyes because the field of vision of the human eye is well below 360 degrees. Conventionally, to obtain a panoramic view, users employ expensive, specialized image capturing devices. However, the costs are prohibitive for most users. Alternatively, a user can capture a number of overlapping images and consolidate them into a panoramic view. However, this consolidating is imprecise as the images cannot be captured simultaneously.

Accordingly, there exists a need for a method for synchronized multi-perspective image capture. The method should allow for the simultaneous and/or synchronized multi-perspective image capture of a common subject matter without requiring expensive or specialized devices. The present invention addresses such a need.

SUMMARY OF THE INVENTION

In a method for synchronized multi-perspective image capture, an ad hoc network is formed between a plurality of image capture devices. A leader is then selected from the plurality of image capture devices. The leader sends the other image capture devices (termed "followers") a capture message. In response to the capture message, the follower image capture devices synchronously capture images of a common subject matter. The follower image capture devices send their respective captured images to the leader. The leader then consolidates the captured images. In this manner, simultaneous and/or synchronized multi-perspective image capture of a common subject matter is accomplished without requiring expensive or specialized devices.

DETAILED DESCRIPTION

The present invention provides a method for synchronized multi-perspective image capture. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 5 in conjunction with the discussion below.

Figure 1:
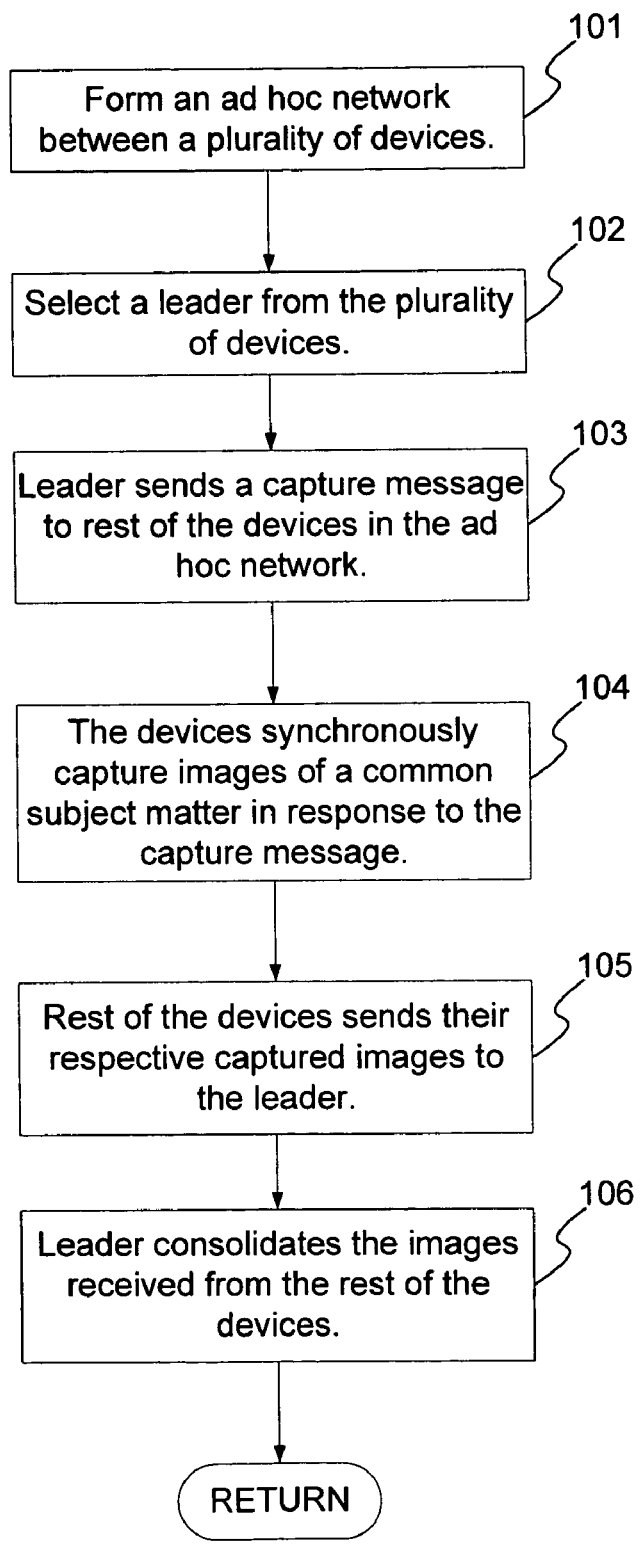
FIG. 1 is a flowchart illustrating a preferred embodiment of a method for synchronized multi-perspective image capture in accordance with the present invention.
Figure 2:
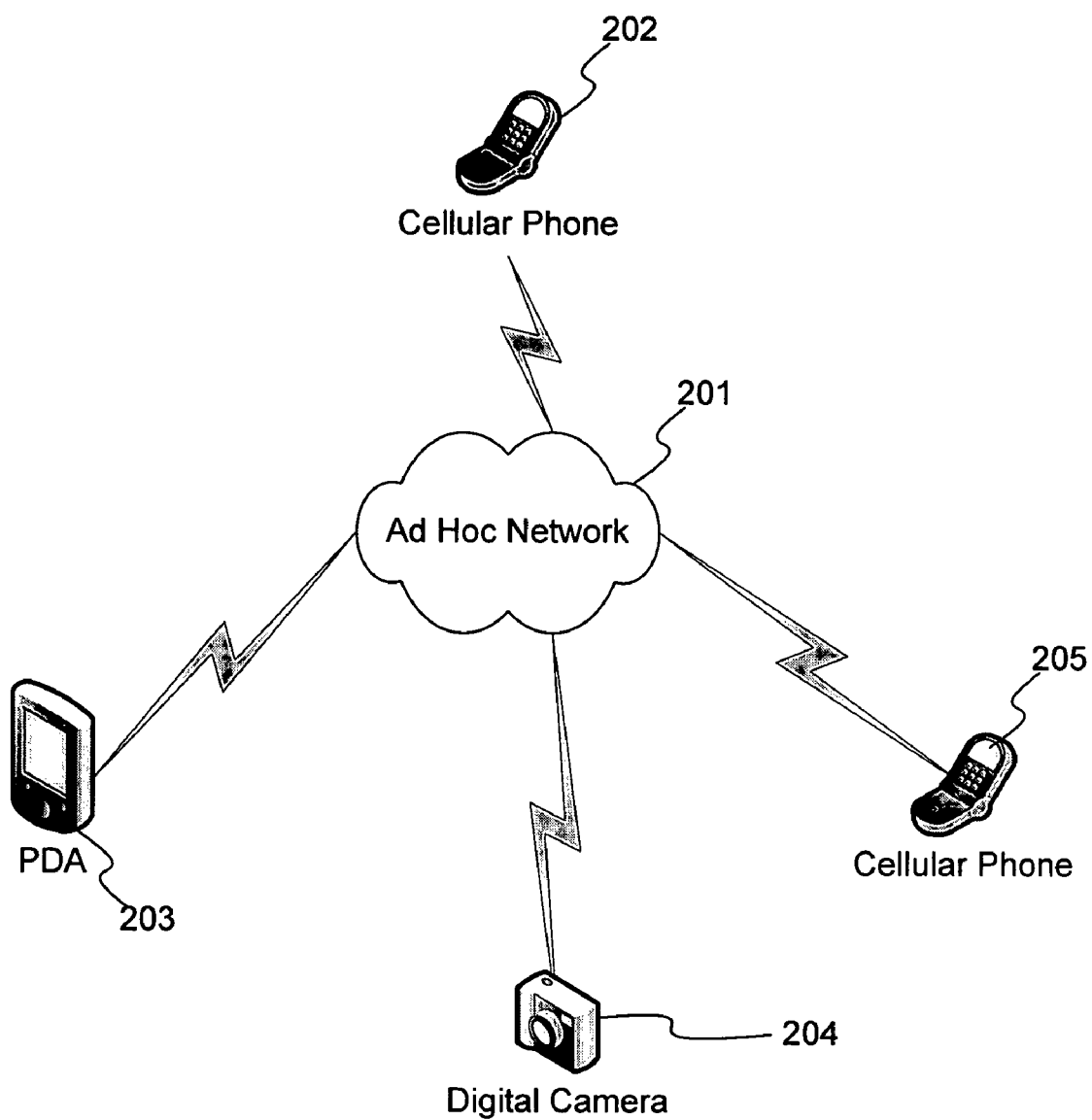
FIG. 2 illustrates a preferred embodiment of the ad hoc network formed in accordance with the present invention.

FIG. 1 is a flowchart illustrating a preferred embodiment of a method for synchronized multi-perspective image capture in accordance with the present invention. First, an ad hoc network is formed between a plurality of devices, via step 101. FIG. 2 illustrates a preferred embodiment of the ad hoc network formed in accordance with the present invention. The ad hoc network 201 can be of any type, such as a Bluetooth™ piconet. The devices can be any image capture device, such as a cellular phone 202 with an image capture feature, a personal digital assistant (PDA) 203 with an image capture feature, or a digital camera 204. Once the ad hoc network 201 is formed, a leader, such as device 202, is selected from some or all of the plurality of devices in the ad hoc network 202-205, via step 102. The leader 202 then sends a capture message to the devices 203-205 in the ad hoc network 201 for whom it is the leader, via step 103. The devices 202-205 then synchronously capture images of a common subject matter in response to the capture message, via step 104. The rest of the devices 203-205 then send their respective captured images to the leader 202, via step 105. The leader 202 consolidates these images, via step 106.

Figure 3:
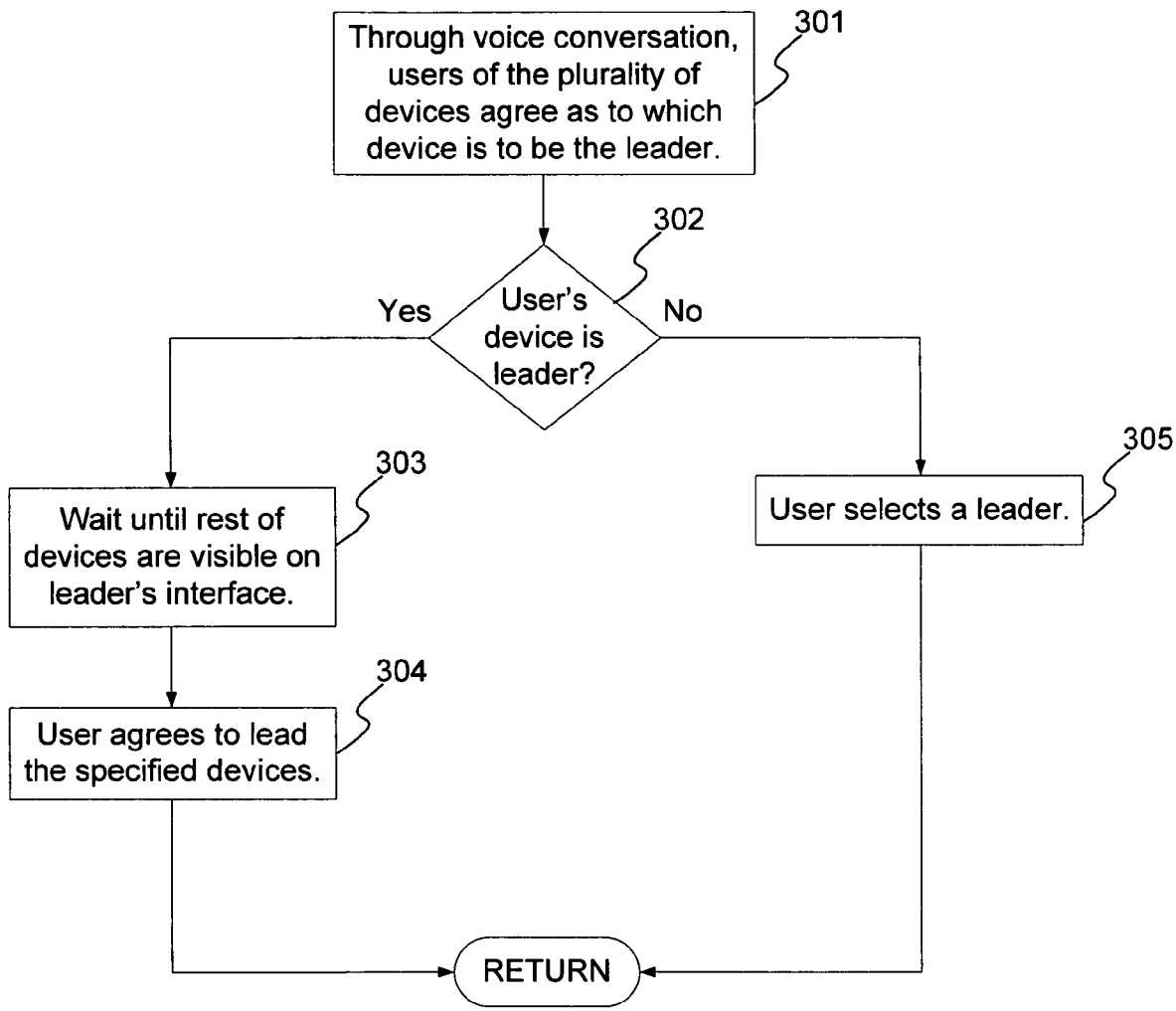
FIG. 3 is a flowchart illustrating in more detail the selection of a leader in the method in accordance with the present invention.

FIG. 3 is a flowchart illustrating in more detail the selection of a leader in the method in accordance with the present invention. Ahead of time, through, for example, voice conversation, the users of the plurality of devices 202-205 agree as to which device is the leader, via step 301. This decision is confirmed by each user through his or her device. This ensures that the leader and follower are in a consistent state. Moreover, it ensures that the respective devices know that they are authorized by their users to participate in the desired manner and to exchange information with the other devices. If a user's device 202 is selected as the leader, via step 302, then its user waits until all of the other devices 203-205 in the ad hoc network 201 are visible on the leader's interface, via step 303. The user of the leader 202 then agrees to lead the specified devices, via step 304. If a user's device 202 is not selected as the leader, via step 302, then the user selects a leader from among the other devices 203-205, via step 305.

Figure 4:
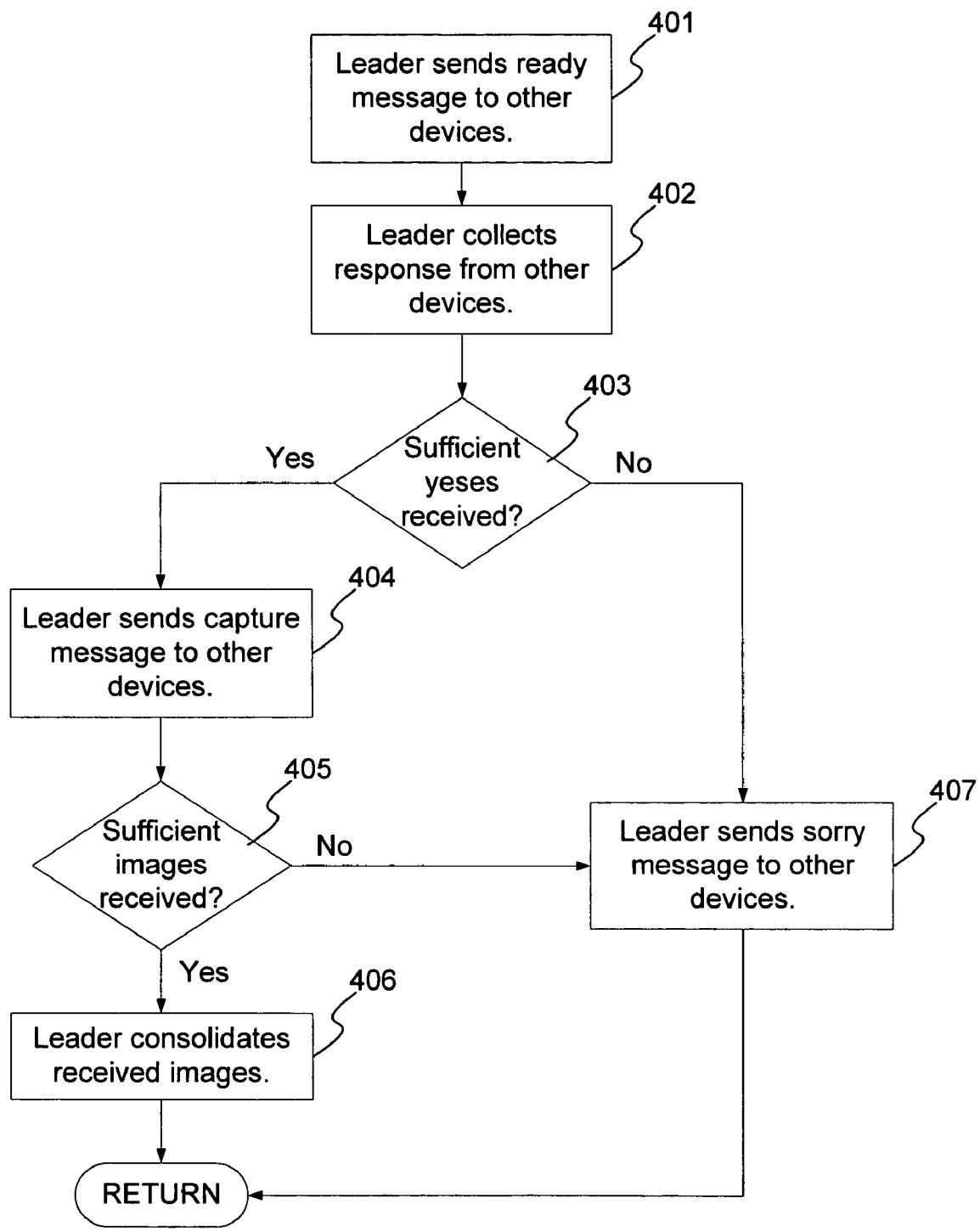
FIG. 4 is a flowchart illustrating in more detail the capturing of the images in the method in accordance with the present invention.

FIG. 4 is a flowchart illustrating in more detail the capturing of the images in the method in accordance with the present invention. First, the leader 202 sends a ready message to the other devices 203-205 in the ad hoc network 201, via step 401. The leader 202 then collects the responses to the ready message from the other devices 203-205, via step 402. If sufficient "yeses" were received from the other devices 203-205, via step 403, then the leader 202 sends the capture message to the other devices 203-205, via step 404. Upon receiving the capture message, the follower devices 203-205 capture images of the common subject matter. For example, the capture message can be automatically sent to the other devices 203-205 when the user of the leader 202 presses the capture button. Upon receipt of this message, the capture buttons on the other devices 203-205 are also triggered. Thus, the plurality of devices 202-205 essentially capture images simultaneously.

Once the images are captured, the other devices 203-205 send their images to the leader 202. If sufficient images were received, via step 405, then the leader 202 consolidates the received images, via step 406. However, the images can be insufficient in number or quality. In this case, the leader 202 sends a sorry message to the other devices 203-205, via step 407. The leader 202 can then either retry by sending another capture message, or terminate the attempt.

Figure 5:
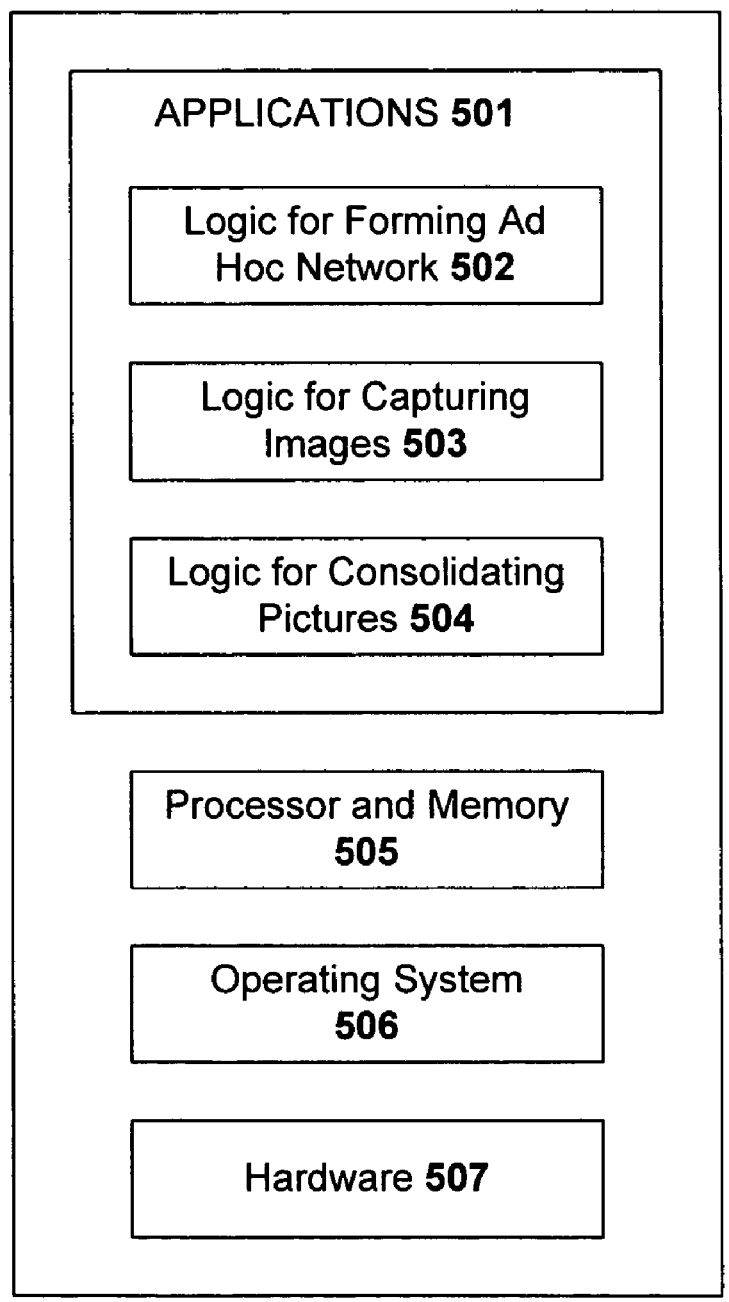
FIG. 5 illustrates a preferred embodiment of a device implementing the method for synchronized multi-perspective image capture in accordance with the present invention.

FIG. 5 illustrates a preferred embodiment of a device implementing the method for synchronized multi-perspective image capture in accordance with the present invention. The device 202 includes applications 501, a processor and memory 505, an operating system 506, and hardware 507. To implement the method, the applications 501 includes logic 502 for forming an ad hoc network, logic 503 for capturing images, and logic 504 for consolidating the images. Alternatively, a device can exclude the logic 504 for consolidating images if it is not designed to function as a leader.

For example, assume that a group of users, each with a digital camera, wishes to capture images of the Empire State Building from different perspectives. First, the users form an ad hoc network with their digital cameras, via step 101. They then select a leader, via step 102. In selecting the leader, through voice conversation, the users decide which of them will be the leader. That user's digital camera then functions as the leader, via step 301. The leader's user waits until the rest of the digital cameras are visible on its camera interface, via step 303. The user then agrees to lead the other digital cameras, via step 304.

Once the leader is selected, and the users are in their desired positions around the Empire State Building, the leading digital camera sends a ready message to the other digital camera, via step 401. The leading digital camera collects the responses from the other digital cameras, via step 402. If sufficient "yeses" were received, via step 403, then the leading digital camera sends a capture message to the other digital cameras, via step 404. Assume in this example that all of the digital cameras in the ad hoc network captures good-quality images of the Empire State Building. The leading digital camera then determines that sufficient images were received from the other digital cameras, via step 405, and consolidates the images, via step 406.

The method can also be used to capture multi-perspective images of a landscape, where the users position themselves in a circle, with each device pointing outward from the circle, and the view of each device overlapping partially with those on either side of it. Each device can then capture an image of a different part of the landscape. The consolidated image would then display a 360 degree view of the landscape.

The method can also be used to capture multi-perspective images of a sporting event, such as an auto-race. The users can position themselves at various locations around the race track, with each device pointing toward the race track. Each device can then capture an image of a different part of the race.

A method for synchronized multi-perspective image capture has been disclosed. The method forms an ad hoc network between a plurality of image capture devices. A leader is then selected from the plurality of image capture devices. The leader sends the other image capture devices (termed "followers") a capture message. In response to the capture message, the follower image capture devices synchronously capture images of a common subject matter. The follower image capture devices send their respective captured images to the leader. The leader then consolidates the captured images. In this manner, simultaneous and/or synchronized multi-perspective image capture of a common subject matter is accomplished without requiring expensive or specialized devices.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

For example, the image capture request from the leader could be tagged with a unique identifier based on the leader's physical identifier (such as MAC address or equivalent) or the user's email address plus a timestamp. The images supplied by the follower devices could be tagged with their identifiers as well as the tag of the request to which they respond. Such tagging can facilitate storage and retrieval of the images. The leader could be used as above to control the image capture process. However, the images that are dispatched by the various image capturing devices may be sent to some other location, such as another of the designated devices within the present ad hoc network, or to a remote server. The consolidation could be performed by the recipient of the images right away or could be performed on demand when requested by a user. The images could be sent using any of a variety of techniques, including but not limited to network protocols such as TCP/IP, email, Multimedia Messaging, device synchronization, and even via transport of physical media such as flash memory or CD. In such cases the timestamps and signatures as described above could be used to store and retrieve the images so that different images taken from the same image capture can be correlated with each other.

What is claimed is:

1. A method for synchronized multi-perspective image capture, comprising:

forming an ad hoc network between a plurality of image capture devices;

selecting a leader from the plurality of image capture devices, wherein the selecting further comprises:

determining the leader by a plurality of users of the plurality of image capture devices;

waiting until the other image capture devices are visible on an interface of the leader; and agreeing to lead the other image capture devices by a user of the leader;

sending a capture message from the leader to the other image capture devices of the plurality of image capture devices; and synchronously capturing images of a common subject matter by the other image capture devices in response to the capture message.

2. The method of claim 1, further comprising:

sending the captured images from the other image capture devices to the leader; and consolidating the captured images by the leader.

3. The method of claim 1, wherein the sending comprises:

sending a ready message from the leader to the other image capture devices;

collecting responses from the other image capture devices by the leader;

determining if sufficient "yeses" are received from the other image capture devices; and sending the capture message from the leader to the other image capture devices, if sufficient "yeses" are received.

4. The method of claim 2, wherein the consolidating comprises:

determining if sufficient images are received from the other image capture devices by the leader; and consolidating the received images, if sufficient images are received.

5. A computer readable medium embodying computer program instructions for synchronized multi-perspective image capture, the computer program instructions comprising:

forming an ad hoc network between a plurality of image capture devices;

selecting a leader from the plurality of image capture devices; wherein the selecting instruction further comprises instructions for:

determining the leader by a plurality of users of the plurality of image capture devices;

waiting until the other image capture devices are visible on an interface of the leader; and agreeing to lead the other image capture devices by a user of the leader;

sending a capture message from the leader to the other image capture devices of the plurality of image capture devices; and synchronously capturing images of a common subject matter by the other image capture devices in response to the capture message.

6. The medium of claim 5, further comprising instructions for:

sending the captured images from the other image capture devices to the leader; and consolidating the captured images by the leader.

7. The medium of claim 5, wherein the sending instruction comprises instructions for:

sending a ready message from the leader to the other image capture devices;

collecting responses from the other image capture devices by the leader;

determining if sufficient "yeses" are received from the other image capture devices; and sending the capture message from the leader to the other image capture devices, if sufficient "yeses" are received.

8. The medium of claim 6, wherein the consolidating instruction comprises instructions for:

determining if sufficient images are received from the other image capture devices by the leader; and consolidating the received images, if sufficient images are received.

9. A method for synchronized multi-perspective image capture, comprising:

joining an ad hoc network including a plurality of image capture devices;

receiving a notification of a selection as a leader from the plurality of image capture devices;

waiting until the other image capture devices are visible on an interface;

sending a notification agreeing to lead the other image capture devices;

sending a capture message to the plurality of image capture devices; and synchronously capturing an image of a common subject matter with the plurality of image capture devices capturing images of the common subject matter in response to the capture message.

* * * * *